United States Patent Office 3,428,610
Patented Feb. 18, 1969

3,428,610
POLYURETHANES PREPARED FROM AROMATIC AMINES HAVING ALKYL GROUPS IN THE ORTHO POSITIONS TO THE AMINE GROUPS
Wolfgang Klebert, Leverkusen, Germany, assignor to Farbenfabriken Bayer Aktiengesellschaft, Leverkusen, Germany, a corporation of Germany
No Drawing. Filed May 10, 1966, Ser. No. 548,858
Claims priority, application Germany, May 14, 1965, F 46,056
U.S. Cl. 260—75      5 Claims
Int. Cl. C08g 22/04

ABSTRACT OF THE DISCLOSURE

Cross-linked polyurethanes are prepared by reacting (1) one equivalent of an intermediate containing between 0.5 percent and 15 percent free NCO groups with (2) between 0.8 and 1.2 equivalents of an aromatic diamine having (i) one linear alkyl substituent of 1 to 3 carbon atoms in an ortho position to one amino group and two linear alkyl substituents of 1 to 3 carbon atoms in both ortho positions to the other amino group, or (ii) two linear alkyl substituents of 1 to 3 carbon atoms in both ortho positions of both amino groups.

---

This invention relates to crosslinked polyurethane plastics and to a method of preparing the same. More particularly, it relates to new crosslinked polyurethane using different extenders.

It is known to produce plastics having elastomeric properties by the isocyanate polyaddition process. By way of example, linear polyesters having terminal OH-groups can be reacted with an excess of diisocyanates and the polyester urethanes containing isocyanate groups which are formed are then reacted with aromatic diamines at relatively high temperatures to yield a melt which can be cast. After shaping, this melt is cured by heating for several hours at 100° C. A preliminary condition in this respect is that the NCO-polyester urethanes do not react too quickly with the diamines serving as chain-extending agents, in order that an appropriate processing time in the liquid phase is guaranteed. It is thus necessary to combine reactive diisocyanates with diamines having a sluggish reaction, and vice versa. In this respect, aromatic diamines which have proved especially suitable are those which comprise additional chlorine substituents in the benzene ring, for example, o-dichlorobenzidine, 2,5-dichloro-phenylene-1,4-diamine, 4,6-dichloro-phenylene-1,3 - diamine and 3,3′-dichloro-4,4′-diaminodiphenylmethane (as well as toluylene diamine, when it is used in conjunction with hexamethylene diisocyanate). The decided disadvantage of this process, from a technical processing aspect, is that the state of cross linking of the cast (or injection-molded) specimens is only reached by subsequent heating for 4 to 12 hours at 100° C.

Furthermore, it is known to produce plastics by the isocyanate polyaddition process at a temperature which is not raised or is only slightly raised by adding, to the reaction mixtures, catalysts which strongly accelerate the reactions between isocyanate and amines, on the one hand, and isocyanate and the forming urea compounds, on the other hand. Nevertheless, this method has the disadvantage that the plastics containing the catalyst are substantially impaired as regards their hydrolysis stability and thermostability.

It is therefore an object of this invention to provide improved crosslinked polyurethane plastics. Another object of this invention is to provide an improved method of preparing polyurethane plastics. It is still another object of this invention to provide polyurethane plastics with good mechanical properties in combination with high rebound elasticity. It is a further object to provide a process which yields solid elastomers in a short time even when conducted at room temperature.

The foregoing objects and others which will become apparent from the following description are accomplished in accordance with the invention generally speaking by providing crosslinked polyurethane plastics by reacting an intermediate having terminal NCO groups and prepared from an organic compound having at least two active hydrogen atoms, as determined by the Zerewitinoff test, which atoms are reactive with NCO groups, the compound having a molecular weight higher than about 300 and an excess of an organic polyisocyanate with an aromatic diamine having at least one linear alkyl substituent of 1 to 3 carbons atoms in the o-position to each amino group.

Crosslinked plastics of high molecular weight are produced according to the invention at room temperature in a simple manner by the isocyanate polyaddition process without adding catalysts, which plastics are distinguished by good mechanical properties with simultaneously high rebound elasticity.

It would not be expected that a liquid reaction mixture would solidify in a weakly exothermic reaction in a short time, the crosslinked insoluble final state being reached after passing through a plastic intermediate stage and after a few hours. The reaction to produce the crosslinked plastic takes place at room temperature and does not require any supply of external heat. Heretofore, in the production of plastics by the isocyanate polyaddition process, with which a subsequent heating of the shaped specimens was not possible on technical processing grounds, it was necessary to add catalysts which accelerated the reaction to a sufficient degree at normal temperature.

The cured materials are insoluble and no longer can be shaped or deformed by action of heat.

In order to carry out the process according to the invention, a reaction product comprising free NCO-groups is first of all prepared in a manner known per se, for example by reacting an organic compound with at least two active hydrogen atoms and a molecular weight of at least 300 with aliphatic, cycloaliphatic or aromatic polyisocyanates while heating to 80 to 140° C. In one case, the procedure which can be adopted is for the organic compound with the reactive hydrogen atoms to be reacted with a large excess of polyisocyanate and subsequently for the excess polyisocyanate to be removed under reduced pressure at high temperature. This yields adducts which have not experienced any substantial chain-lengthening and as a consequence, they have a relatively low viscosity. In the other case, the reaction can take place with a quantity of isocyanate calculated in such manner that there is the required excess of NCO-groups to each OH-group. The mixture is heated for so long to relatively high temperature that the theoretically calculated NCO-content is reached or is not quite reached.

The adducts which are obtained should comprise 0.5 to 15% and advantageously 2 to 7% of free NCO-groups. In addition, free polyisocyanates can also be added to the isocyanate initial adducts within the limits indicated above.

Any suitable organic compounds having active hydrogen atoms and a molecular weight of at least 300 can be used, such as, for example, linear or slightly branched hydroxyl polyesters, with molecular weights up to 6000 and advantageously between 1000 and 3000, polyhydric polyalkylene ethers, polythioethers, polyacetals and the like.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, oxalic acid, methyl adipic acid, glutaric acid, pimelic acid, azelaic acid, phthalic acid, terephthalic acd, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxy methyl-cyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, beta-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane-4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the Encyclopedia of Chemical Technology, volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(beta-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Any suitable organic polyisocyanate may be used such as aliphatic polyisocyanate having the formula $$OCN-(CH_2)_n-NCO$$

in which $n=2$ to 8 such as ethylene diisocyanate, propylene diisocyanate, butylene diisocyanate, hexamethylene diisocyanate and the like, cyclohexylene-1,4-diisocyanate and cyclohexylene-1,3-diisocyanate, hexahydrotoluylene-2,4-diisocyanate and hexahydrotoluylene-2,6-diisocyanate, dicyclohexylmethane-4,4'-diisocyanate, aromatic diisocyanates such as toluylene-2,4-diisocyanate and toluylene-2,6-diisocyanate, phenylene-1,4-diisocyanate and phenylene-1,3 - diisocyanate, diphenylmethane-4,4'-diisocyanate, naphthylene-1,5-diisocyanate or even also triisocyanates, for example, triisocyanato benzene, triphenylmethane-4,4',4''-triisocyanate, the reaction product of 3 mols of hexamethylene diisocyanate and 1 mol of water, which advantageously are introduced in proportions as well as a diisocyanate.

Any suitable aromatic diamine having at least one linear alkyl substituent with 1 to 3 carbon atoms in the o-position may be used as chain-extenders such as, for example, toluylene-2,6-diamine, 2,5-diaminoxylene, 1,3-diethyl-2,4-diaminobenzene, 2,4-diaminomesitylene, 1 - ethyl - 2,6-diaminobenzene, 1 - methyl-3,5-diethyl-2,4-diaminobenzene, 1-methyl-3,5-diethyl - 2,6 - diaminobenzene, 1,3,5-triethyl-2,6-diaminobenzene, 3,5,3',5'-tetraethyl - 4,4 - diaminodiphenylmethane and 2,6-diethylnaphthylene-1,5-diamine.

It is absolutely preferred to employ diamines which are either liquid or in dissolved state. It is further preferred to use diamines which have at least one linear alkyl substituent in ortho position to the one amino group and two alkyl substituents with 1 to 3 carbon atoms in both the ortho positions of the other amino group. Most preferred are those diamines which have an alkyl substituent in all ortho positions to both amino groups.

The aromatic diamines can also be used in admixture and in additon also in combination with other aromatic diamines.

Preferred are aromatic diamines having at least one linear alkyl substituent in the o-position to the first amino group and two linear alkyl substituents with 1 to 3 carbon atoms in the o-position to the second amino group, and also naphthylene diamines which comprise at least one linear alkyl substituent with 1 to 3 carbon atoms in the o-position to each amino group and more especially aromatic diamines which comprise a linear alkyl substituent with 1 to 3 carbon atoms in both o-positions to each amino group.

For the processing, the diamines to be used according to the invention are added as chain extenders to the reaction product comprising free NCO-groups at room temperature or, in those cases in which there is a solid product at room temperature, they are added at a moderately elevated temperature which is generally up to about 50° C., and care is taken that thorough mixing takes place. Within a short time, there is an exothermic reaction, the mixture passing by way of a plastic state and after complete setting into the cross-linked insoluble final state. Before the material loses its capacity to flow, it should be worked, and this can, for example, be carried out by brushing, casting, injection-molding, spraying or centrifuging. Films, plates, solid molded elements and the like are obtained in this way. The curing in order to obtain the maximum mechanical properties of the products to be obtained takes a few hours up to days. The curing process can be shortened by a heat treatment.

A proportion of diamine is expediently so chosen that the ratio between NCO- and NH$_2$-groups is within the limits of 1:0.8 to 1.2, harder or softer products being the result. Generally, a ratio of 1:0.95 to 1:1.05 is chosen. The hardness and mechanical properties of the plastics which are obtained can moreover be varied, as already mentioned, by adding free polyisocyanates to the isocyanate initial adducts and reacting these mixtures with the corresponding quantity of chain-extender. Since the reaction is accelerated by this step, it is obvious that only limited quantities of free polyisocyanate can be added, and the admixture of less reactive aliphatic polyisocyanates can again be greater than that of the reactive aromatic polyisocyanates.

From a technical processing point of view, it is an advantage with this process that a number of the diamines used according to the invention as chain-extenders exist in liquid form at room temperature: for example, 2-ethyl-1,3-diaminobenzene, 1-methyl - 3,5 - diethyl-2,4-diaminobenzene or a mixture of these with 1-methyl-3,5-diethyl-2,6-diaminobenzene and 1,3,5-triethyl - 2,4 - diaminobenzene.

When diamines which are crystalline at room temperature are to be used, it is appropriate to dissolve these in a smallest possible quantity of an organic solvent which is unable to react either with the polyisocyanates or with the amines. Likewise, solvents can be added to the isocyanate initial adduct before the subsequent reaction. By this means, the mixing and the further processing is frequently facilitated because of the lowering of the viscosity. Acetone, dioxane, tetrahydrofuran, dimethyl formamide or benzene are, for example, suitable.

Depending on the nature of the isocyanate initial adducts and diamines which are used, the processing times vary between 3 and 45 minutes. The use of highly substituted aromatic diamines permits a lengthening of the processing time, while initial adducts with a high isocyanate content cause a shortening thereof.

It is readily possible to add dyestuffs and inorganic or organic fillers. The properties of the final products can often be influenced in advantageous manner by this addition. The thorough mixing of the individual components is an obvious prerequisite.

As well as processing by hand, it is possible with advantage to use any mechanical processing methods for the production of the plastics, which permit a continuous mixing of the reaction product comprising NCO-groups with the aromatic diamines to be used according to the invention. For example, many different types of molded articles can be produced by casting or by centrifugal casting. Other uses are presented in the field of the sealing compositions for sealing joints or packing pipe connections, and also as floor or road surfaces, as a printing composition or as adhesives. Freely supporting foils can also be produced in a simplest possible manner or textiles or paper can be impregnated or coated therewith. The high speed at which the reaction can be carried out permits the rubberizing of vertical surfaces and thus, for example, the lining of containers. By suitable adjustment, the composition can also be used with continuously operating injection molding machines for the production of endless flexible tubes of any profile.

The invention is further illustrated but not limited by the following examples in which parts are by weight unless otherwise specified.

Example 1

About 1000 parts of a linear polypropylene glycol (OH number 113) are dehydrated in vacuo at 130° C. for about one hour. It is allowed to cool to about 60° C. and about 1200 parts of hexamethylene diisocyanate are added. The mixture is heated while stirring for about 4 hours to about 130° C. Excess hexamethylene diisocyanate is distilled off in a rotary evaporator up to 140° C./0.1 mm. Hg. A thinly liquid polyether isocyanate is obtained, which comprises 6.3% of free isocyanate groups and a viscosity of 1650 cp./25° C.

About 250 parts of polyether isocyanate are thoroughly mixed at room temperature with about 31.2 parts of 1-methyl-3,5-diethyl-1,3-phenylene diamine, corresponding to a ratio between NCO- and NH$_2$-groups of 1.075 to 1. After about 2 minutes, a vacuum is briefly applied to remove the air bubbles and the still thinly liquid reaction mixture is then poured into a mold. About 20 minutes later, such a degree of solidification has occurred that a homogeneous, transparent plastic plate can be removed from the mold. After being cured for two days at room temperature, this plate has the following values:

Tensile strength (DIN 53 504) _____ kp./cm.$^2$__ 210
Elongation at break _____ percent__ 410
Permanent elongation _____ do____ 11
Structural strength _____ kp__ 27
Shore hardness (DIN 53 505) A _____ 92
Shore hardness (DIN 53 505) D _____ 44
Elasticity _____ percent__ 54

Example 2

A solution of about 34.1 parts of 2,6-diethyl naphthylene-1,5-diamine in about 80 parts by volume of tetrahydrofuran is added to about 220 parts of the polyether isocyanate of Example 1 and they are thoroughly mixed. A vacuum is then applied for about 5 minutes in order to remove the main quantity of the solvent and the thinly liquid mass is poured into a mold. After about one hour, the mold can be emptied. A transparent, reddish-brown plastic material is obtained which, after storing for 8 days until the weight is constant, has the following physical properties:

Tensile strength (DIN 53 504) _____ kp./cm.$^2$__ 136
Elongation at break _____ percent__ 385
Permanent elongation _____ do____ 72
Structural strength _____ kp__ 39
Shore hardness (DIN 53 505) A _____ 95
Shore hardness (DIN 53 505) _____ 41
Elasticity (DIN 53 512) _____ percent__ 57

Example 3

About 1000 parts of a polyester prepared from 15 mols of diethylene glycol and 14 mols of adipic acid (OH number 46; acid number 1.3) are freed from moisture by heating for about one hour to about 130° C. under reduced pressure, thereafter cooled and mixed with about 1000 parts of hexamethylene diisocyanate. This mixture is heated while stirring for about two hours to about 110° C. Excess hexamethylene diisocyanate is thereafter removed from the reaction product by means of a rotary evaporator at temperatures up to about 140° C./0.1 mm. Hg. The result is a clear, viscous polyester isocyanate with a content of 3.7% of free NCO-groups. The viscosity is 20 125 cp./25° C.

About 250 parts of the polyester isocyanate are thoroughly mixed at room temperature and for two minutes with about 19.6 parts of 1-methyl-3,5-diethyl-phenylene-2,4-diamine and poured into a mold. The mold can be emptied after about 20 minutes. The transparent, homogeneous plastic plate which is obtained is stored for two days and then has the following physical properties:

Tensile strength (DIN 53 504) _____ kp./cm.$^2$__ 119
Elongation at break _____ percent__ 510
Permanent elongation _____ do____ 8
Structural strength _____ kp__ 20
Shore hardness (DIN 53 505) A _____ 86
Elasticity (DIN 53 512) _____ percent__ 60

Example 4

About 250 parts by weight of the polyester isocyanate of Example 3 are reacted with a solution of about 16.5 parts of 1,3,5-trimethylphenylene-2,4-diamine in about 22 parts by volume of tetrahydrofuran under the same conditions as Example 3. After storing for about 8 days until the weight is constant, a plastic paint is obtained which has the following material values:

Tensile strength (DIN 53 504) _____ kp./cm.$^2$__ 110
Elongation at break _____ percent__ 475
Permanent elongation _____ do____ 13
Structural strength _____ kp__ 32
Shore hardness (DIN 53 505) A _____ 89
Elasticity (DIN 53 512) _____ percent__ 62

Example 5

About 250 parts of the polyester isocyanate of Example 3 are thoroughly mixed at room temperature with a solution of about 13.4 parts of toluylene-2,6-diamine in about 22 parts by volume of tetrahydrofuran and poured into a mold. After about 20 minutes, a transparent reddish-brown plastic plate can be removed from the mold and, after this plate has been stored for 8 days until the weight is constant, it has the following physical properties:

| | |
|---|---|
| Tensile strength (DIN 53 504) kp./cm.$^2$ | 147 |
| Elongation at break percent | 450 |
| Structural strength kp | 27 |
| Shore hardness (DIN 53 505) A | 92 |
| Shore hardness (DIN 53 505) D | 41 |
| Elasticity (DIN 53 512) percent | 48 |

Example 6

About 1000 parts of a linear, dehydrated polypropylene glycol (OH-number 56) are heated with about 175 parts of toluylene-2,4-diisocyanate for about 3 hours to about 90° C. After cooling to room temperature, the isocyanate content is 3.1% and the viscosity is 4446 cp./25° C.

About 278 parts of the polyether isocyanate are mixed with about 17.8 parts of 1-methyl-3,5-diethylphenylene-2,4-diamine at room temperature and cast to form a bubble-free plate. After storing for 2 days, the following physical properties are found:

| | |
|---|---|
| Tensile strength (DIN 53 504) kp./cm.$^2$ | 169 |
| Elongation at break percent | 850 |
| Permanent elongation do | 48 |
| Structural strength kp | 22 |
| Shore hardness (DIN 53 505) A | 75 |
| Elasticity (DIN 53 512) percent | 54 |

Example 7

A polyether isocyanate comprising about 5.6% of free NCO-groups is prepared from about 1000 parts of a linear polypropylene glycol (OH number 113) and about 1500 parts of toluylene-2,4-diisocyanate and toluylene-2,6-diisocyanate in the isomer ratio of 65:35 by these being heated for about one hour to about 130° C., as in Example 1.

About 250 parts of the polyether isocyanate are stirred at room temperature with about 32 parts of 1,3,5-triethylphenylene-2,4-diamine and cast to form a plate. After storing for two hours, the following material values are established:

| | |
|---|---|
| Tensile strength (DIN 53 504) kp./cm.$^2$ | 120 |
| Elongation at break percent | 255 |
| Permanent elongation do | 17 |
| Structural strength kp | 31 |
| Shore hardness (DIN 53 505) A | 92 |
| Shore hardness (DIN 53 505) | 40 |
| Elasticity (DIN 53 512) percent | 47 |

Example 8

About 1000 parts of a polyester prepared from 2 mols of butanediol and 1 mol of neopentyl glycol and 2,9 mols of adipic acid (OH number 60; acid number 1) are dehydrated at about 130° C. in vacuo for about one hour and, after cooling, 1000 parts of hexamethylene diisocyanate are added. The mixture is heated for about two hours to about 120° C. and then the excess hexamethylene diisocyanate is extracted in a rotary evaporator up to 140° C./0.1 mm. Hg. The polyester isocyanate, which has 4.3% of free NCO-groups is in the form of a waxy mass.

About 244 parts of the polyester isocyanate are dissolved in about 60 parts of anhydrous acetone. About 22.2 parts of 1-methyl-3,5-diethylphenylene-2,4-diamine are incorporated by stirring into this solution, which is evacuated for a short time in order to remove the main quantity of the acetone and then the melt is cast into a plate. After stirring for about 8 days until the weight is constant, the resulting transparent plastic element has the following technical properties:

| | |
|---|---|
| Tensile strength (DIN 53 504) kp./cm.$^2$ | 170 |
| Elongation at break percent | 505 |
| Permanent elongation do | 11 |
| Shore hardness (DIN 53 505) | 85 |
| Elasticity (DIN 53 512) percent | 49 |

Example 9

A polyether isocyanate which has 3.5% of free NCO-groups and a viscosity of 1946 cp./25° C. is prepared from about 1000 parts of a linear polypropylene glycol (OH number 56) and about 1000 parts of hexamethylene diisocyanate being heated for about 4 hours to about 130° C., as in Example 3.

About 240 part portions of the polyether isocyanate are reacted with solutions of such quantities of different aromatic diamines in about 20 parts by volume of tetrahydrofuran that an NCO/NH$_2$ ratio of about 1.11 is obtained. Plates are cast which, after curing, are first of all stored for about 20 hours at about 50° C. for removing the solvent and then for about another 7 days until a constant weight is reached. The results are indicated in Table I.

TABLE I

| | Amine | Shore Hardness A | Elasticity, Percent | Valuation |
|---|---|---|---|---|
| A | 3,3'-dichloro-4,4'-diaminodiphenylmethane | 49 | 40 | Heating for 12 hours at 110° C. necessary for solidification; soft plate with little elasticity, mechanical properties very poor. |
| B | Phenylene-1,3-diamine | 52 | 41 | Soft plate with little elasticity, moderate mechanical properties. |
| C | Toluylene-2,4-diamine | 51 | 40 | Do. |
| D | 1,3,5-triisopropylphenylene-2,4-diamine | 52 | 45 | Do. |
| E | Toluylene-2,6-diamine | 89 | 60 | Hard highly elastic plate, good mechanical properties. |
| F | 1,3,5-trimethylphenylene-2,4-diamine | 84 | 68 | Highly elastic plate, medium hardness, good mechanical properties. |
| G | Mixture of 65 parts of 1-methyl-3,5-diethylphenylene-2,4-diamine and 35 parts of 1-methyl-3,5-diethylphenyl-2,6-diamine. | 78 | 62 | Highly elastic plate, medium hardness, good mechanical properties. |
| H | 1,3,5-triethylphenylene-2,4-diamine | 80 | 61 | Do. |
| I | 2,6-diethylnaphthylene-1,5-diamine | 86 | 58 | Hard highly elastic plate, good mechanical properties. |

A–D are comparison tests, E–I correspond to invention.

Example 10

A polyester isocyanate comprising 5.2% of free isocyanate groups and in the form of a waxy mass, is prepared from about 1000 parts of a polyester of ethylene glycol and adipic acid (OH number 56; acid number 1) and about 1000 parts of hexamethylene diisocyanate by heating for about 30 minutes to about 110° C., as in Example 3.

About 50 parts of the polyester isocyanate are dissolved together with about 5.5 parts of a mixture of 65 parts of 1-methyl-3,5-diethylphenylene-2,4-diamine and 35 parts of 1-methyl-3,5-diethylphenylene-2,6-diamine in about 150 parts by volume of tetrahydrofuran and this solution is poured onto a grease-free glass plate. After about 2 hours, a crystal clear foil with a thickness of about 0.3 to 0.5 mm. can be detached therefrom and this foil is stored for about 8 days to remove any solvent which may still be present. Thereafter, the following physical measurement values are established:

Tensile strength (DIN 53 504) _____ kp./cm.$^2$__ 484
Elongation at break _____ percent__ 426
Permanent elongation _____ do____ 25
Resistance to further tearing (DIN 53 515) kp./cm__ 30

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A cross-linked polyurethane prepared by reacting (1) one equivalent of an intermediate containing between 0.5 percent and 15 percent free —NCO groups prepared by reacting an organic polyisocyanate with an organic compound having at least two active hydrogen atoms as determined by the Zerewitinoff test with (2) between 0.8 to 1.2 equivalents of a liquid aromatic diamine having (i) one linear alkyl substituent of 1 to 3 carbon atoms in an o-position to one amino group and two linear alkyl substitutents of 1 to 3 carbon atoms in both o-positions to the other amino groups, or (ii) two linear alkyl substituents of 1 to 3 carbon atoms in both o-positions of both amino groups.

2. The polyurethane of claim 1 wherein the aromatic diamine has at least one linear alkyl substituent in the o-position to the first amino group and two linear alkyl substituents with 1 to 3 carbon atoms in the o-position to the second amino group.

3. The polyurethane of claim 1 wherein the aromatic portion of the diamine is benzene.

4. The polyurethane of claim 1 wherein the aromatic portion of the diamine is naphthylene.

5. The polyurethane of claim 1 wherein the aromatic diamine has a linear alkyl substituent of 1 to 3 carbon atoms in both o-position to each amino group.

References Cited

UNITED STATES PATENTS

| | | | |
|---|---|---|---|
| 2,888,439 | 5/1959 | Simons | 260—77.5 |
| 2,929,800 | 3/1960 | Hill | 260—77.5 |
| 2,929,804 | 3/1960 | Steuber | 260—77.5 |
| 3,105,062 | 9/1963 | Graham et al. | 260—77.5 |
| 3,188,302 | 6/1965 | Lorenz | 260—77.5 |
| 3,194,793 | 7/1965 | Kogon | 260—77.5 |

FOREIGN PATENTS

| | | |
|---|---|---|
| 208,981 | 7/1957 | Australia. |
| 869,562 | 8/1958 | Great Britain. |
| 1,131,398 | 6/1962 | Germany. |

JAMES A. SEIDLECK, *Primary Examiner.*

M. J. WELSH, *Assistant Examiner.*

U.S. Cl. X.R.

260—77.5